United States Patent [19]

Scragg

[11] Patent Number: 4,528,094
[45] Date of Patent: Jul. 9, 1985

[54] SEPARATION OF TWO LIQUIDS

[76] Inventor: Edgar P. Scragg, 60 Mulder St., Florida Park Extn. 3, Florida, Transvaal Province, South Africa

[21] Appl. No.: 403,266

[22] Filed: Jul. 29, 1982

[30] Foreign Application Priority Data

Aug. 6, 1981 [ZA] South Africa .................. 81/5416
Nov. 30, 1981 [ZA] South Africa .................. 81/8295

[51] Int. Cl.³ ............................................. B01D 21/24
[52] U.S. Cl. ................................. 210/114; 210/119; 210/123; 210/533
[58] Field of Search ............... 210/304, 319, 114, 115, 210/111, 787, 788, 533, 799, 117, 119, 121, 123, 136, 145, 416.4, 416.5, 456; 137/192, 195

[56] References Cited

U.S. PATENT DOCUMENTS

| 895,083 | 8/1908 | Gardiner | 210/111 |
| 2,180,811 | 11/1939 | King | 210/728 |
| 2,311,697 | 3/1943 | Samiran | 210/115 |
| 2,613,812 | 10/1952 | Yancey | 210/114 |
| 2,844,254 | 7/1958 | Ansley | 210/114 |
| 3,507,098 | 4/1970 | Veres et al. | 210/304 |
| 3,568,835 | 3/1971 | Hansen | 210/115 |
| 3,685,655 | 8/1972 | Muller | 210/119 |
| 4,014,791 | 3/1977 | Tuttle | 210/114 |
| 4,132,646 | 1/1979 | Bartlett et al. | 210/114 |
| 4,136,009 | 1/1979 | Samiran | 210/114 |

FOREIGN PATENT DOCUMENTS 411102 8/1923 Fed. Rep. of Germany .

Primary Examiner—Richard V. Fisher
Assistant Examiner—Wanda L. Millard
Attorney, Agent, or Firm—Ladas & Parry

[57] ABSTRACT

A device for separating two liquids one of which is heavier than the other. The device comprises a main chamber (120) in which there is a float (128). The float is such that it sinks in the lighter of the liquids and floats in the heavier. A control chamber (140) having a fixed wall part (142) and a movable wall part (144) is provided. The movable wall part is subjected to the pressure existing in the main chamber which urges the movable wall part in the direction which reduces the volume of the control chamber. A restricted inlet (146) places the control chamber and main chamber in communication. There is an outlet (158) from the control chamber which is normally closed by a valve (168). The valve is opened, mechanically or electrically, when the float rises upon heavier liquid accumulating in the main chamber. A valve seat (160) surrounds an outlet (156) from the main chamber. Said movable wall part engages said seat to close the main outlet until movement of the movable wall part occurs upon said valve (168) being opened. The valve operating member (170) and the float are each provided with engagement surfaces (172, 174, 176, 178). Upon the float rising due to the accumulation of the heavier liquid in the chamber, the surface on the rotating float engages the surface on the valve operating member so that a chattering action is exerted on the valve operating member.

18 Claims, 3 Drawing Figures

SEPARATION OF TWO LIQUIDS

This invention relates to the separation of two liquids.

It is known to use the difference in specific gravities between two liquids to enable them to be separated. This technique has been used in the separation of water from diesel fuel. Generally, a float is used which sinks in the lighter liquid and floats in the heavier. As the heavier liquid accumulates, the float lifts and operates a switch. The switch connects to a pump or solenoid operated valve at the outlet of the float chamber. Pumps are expensive and to keep the cost of the device down, their use should be avoided.

The present invention seeks to provide a device for separating two liquids which device is reliable in operation, is inexpensive compared with devices which use pumps and which is not prone to vibration induced malfunction when used on trucks.

According to one aspect of the present invention there is provided a device for separating two liquids, the device comprising a float chamber having an inlet with the inlet arranged so that liquid flowing into the chamber through the inlet swirls in the chamber, a float in the float chamber, the float being free to rotate and the float being such that it sinks in the lighter of the liquids to be separated but floats in the heavier of the liquids, an outlet from the device, a normally closed valve for controlling flow through said outlet, a valve operating member for opening and closing the valve, and first and second engagement surfaces, the first engagement surface being on the float and the second engagement surface being on the valve operating member, and at least one of said surfaces being in the form of a ramp which is engaged by the other of said surfaces as the float rotates after rising due to an accumulation of the heavier liquid at the bottom of said chamber whereby said valve operating member is displaced to open said valve.

In one form of the device, said outlet leads from the lower end of the float chamber, said heavier liquid being discharged through this outlet when the normally closed valve is opened.

In this form said valve operating member can comprise a stem which passes upwardly through the float and has on the upper end of the stem a portion which extends radially outwardly from the stem to overlie the float, said second surface being on the underside of said portion and said first surface being on the top face of the float.

Desirably said first and second surfaces are each constituted by a series of surfaces whereby the valve operating member is subjected to a chattering action as the float rotates while the first and second surfaces are in engagement with one another.

To assist in closing the valve, third and fourth engagement surfaces can be provided, at least one of the third and fourth surfaces being in the form of a ramp, the third surface being on the float and the fourth surface being on said stem below the float and engagement between the third and fourth surfaces occuring as the float sinks while the heavier liquid in the lower end of the float chamber is flowing through the open valve whereby said valve operating member is hammered downwardly towards its closed position.

In another form said outlet is an outlet from a control chamber having a fixed wall part and a movable wall part, the movable wall part in use being subjected to the pressure existing in the float chamber which pressure urges the movable wall part in the direction which reduces the volume of the control chamber, there being a restricted inlet to said control chamber from the float chamber, an outlet from said control chamber, and a main outlet from the device, said main outlet being encircled by a valve seat and there being a valve closure member co-operating with said seat and moving with said movable wall part.

In this form there can be a stem which passes through the upper wall of the control chamber, the part of the stem outside the control chamber being attached to the float and the first engagement surface being on said stem within the control chamber and being below the second engagement surface. Preferably said first and second surfaces are each constituted by a series of surfaces whereby the valve operating member is subjected to a chattering action as the float rotates while the first and second surfaces are in engagement with one another. It is also desirable to provide third and fourth engagement surfaces, said second and third surfaces being on downwardly and upwardly directed faces respectively of said valve operating member, said stem passing through said member with said first surface on said stem below said second surface and the fourth surface on the stem above the third surface.

Said float can include fins for promoting rotation thereof. More specifically, said float can comprise a float body with fins protruding radially outwardly from said body.

According to another aspect of the present invention there is provided a device for separating two mixed liquids which device comprises a main chamber having an inlet for the mixed liquids, a float in the main chamber, the float being such that it sinks in the lighter of the two liquids to be separated but floats in the heavier of the liquids, an outlet from the main chamber, a control chamber having a fixed wall part and a movable wall part, the movable wall part in use being subjected to the pressure existing in said main chamber which pressure urges the movable wall part in the direction which reduces the volume of the control chamber, a restricted inlet to said control chamber from the main chamber, an outlet from said control chamber, a valve normally closing said outlet from the control chamber, means forming a connection between said valve and the float so that the valve opens when the float lifts and closes when the float falls, a valve seat encircling said outlet from the main chamber, and a valve closure member co-operating with said seat and moving with said movable wall part to open the outlet from the main chamber upon opening of said valve.

In one form of the invention, said valve is a solenoid valve and said means forming a connection between said valve and the float includes switch means which are actuated when the float lifts.

In another form of the invention said valve includes an element displacable between a position in which it closes said outlet from the control chamber and a position in which this outlet is open, said means forming a connection between said valve and the float being constituted by a mechanical linkage between the float and said element. In this form there can be first and second engagement surfaces, the first engagement surface being on the float and the second engagement surface forming part of said mechanical linkage, and at least one of said surfaces being in the form of a ramp which is engaged by the other of said surfaces as the float rotates after rising due to an accumulation of the heavier liquid at the bottom of said chamber whereby said valve linkage is displaced to open said valve. It is preferable that a stem pass through the upper wall of the control chamber, the part of the stem outside the control chamber being attached to the float and the first engagement surface being on said stem within the control chamber, said linkage being within the control chamber and the first engagement surface being below the second surface.

It is prefered that the first and second surfaces each be constituted by a series of surfaces whereby the valve operating member is subjected to a chattering action as the float rotates while the first and second surfaces are in engagement with one another.

For a better understanding of the present invention and to show how the same may be carried into effect, reference will now be made, by way of example, to the accompanying drawings in which.

Figure 1:
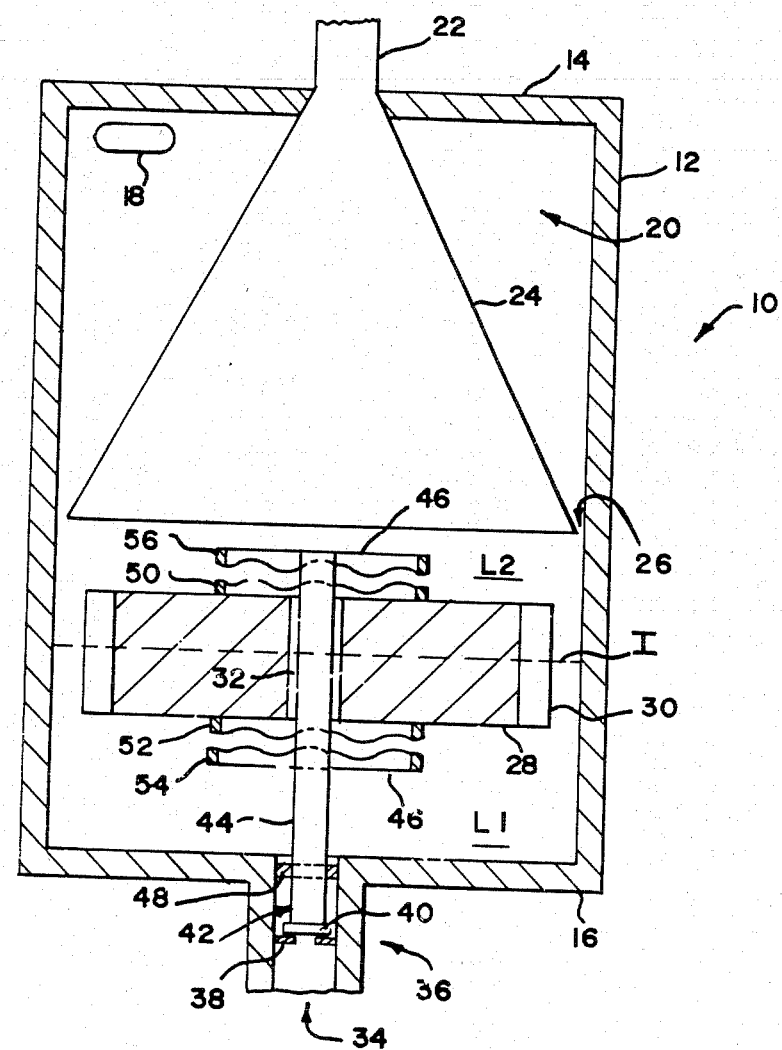
FIG. 1 is a vertical cross section through a device for separating two liquids.

The device illustrated in FIG. 1 of the drawings is specifically intended for the purpose of separating water from diesel fuel, the specific gravity of water being somewhat more than that of diesel fuel. The device comprises a casing 10 having a generally cylindrical side wall 12, an upper wall 14 and a base wall 16. The inlet 18 to the chamber 20 bounded by the walls 12, 14 and 16 is arranged tangentially so that incoming liquid swirls in the chamber 20.

The main outlet from the chamber 20 is designated 22 and it will be seen that this is in the upper wall 14 and co-axial with the side wall 12. An upwardly tapering frusto conical baffle 24 is co-axial with the side wall 12. Between the lower edge of the baffle 24 and the side wall 12 there is an annular gap 26. It will be understood that liquid entering through the inlet 18 swirls around the baffle 24 and enters the lower portion of the chamber 20 through the gap 26. The centrifuging action thus exerted tends to cause the water to accumulate in the region of the wall 12 and to flow into the lower portion of the chamber 20. Diesel fuel almost devoid of water flows through the outlet 22.

In the lower portion of the chamber 20 there is a float comprising a float body 28 from which fins 30 protrude radially, the body 28 having a bore 32 therein. The fins 30 promote rotation of the float in the swirling liquid.

An outlet from the lower part of the chamber 20 is shown at 34, there being a valve diagrammatically shown at 36 which normally closes the outlet 34. The valve 36 is diagrammatically shown as including a seat 38 and a valve closure member 40 which engages the seat 38.

A valve operating member 42 comprising a stem 44 and two disc-like portions 46 is provided. The stem 44 extends from above the float body 28, downwardly through the bore 32, into the outlet 34 and is connected to the valve closure member 40. One of the disc-like portions 46 is above the float body 28 and the other disc-like portion 46 is below the float body. The stem 44 is positively or frictionally locked against rotation. By way of example a spider 48 is shown to lock the member 42 against rotation.

Engagement surfaces shown at 50, 52, 54 and 56 are provided on the upper and lower faces of the float body 28 and on the upper and lower faces respectively of the lower and upper disc-like portions 46. The engagement surfaces 50, 52, 54 and 56 can each be saw-like thereby to provide a series of ramps. Alternatively, one engagement surface of each pair of co-operating engagement surfaces can be ramp-like. In yet another form all the engagement surfaces, or one of each co-operating pair of engagement surfaces, can be sinusoidal in form.

The valve operating member 42 is normally in the position illustrated in which the valve closure member 40 is against the seat 38. An interface I between the heavier liquid L1 and the lighter liquid L2 is assumed at this stage. The float rotates freely between the two disc-like portions 46, there being no engagement between the co-operating pairs of engagement surfaces 50, 56 and 52, 54. As heavier liquid L1 accumulates, the interface I moves upwardly as does the rotating float. Eventually, the surfaces 50, 56 begin to engage. As the valve operating member 42 is held against rotation, engagement of the crests of the surface 50 with the crests of the surface 56 causes a chattering or hammering action to be exerted by the float on the valve operating member 42. When engagement first occurs, the member 42 will not necessarily be displaced upwardly. Its mass will normally be sufficient to resist the light blows being struck by the rotating float and consequently the float will itself be slightly depressed so that the crests which have engaged will pass one another thus permitting the float can continue rotating. However, as more liquid L1 accumulates, and the float rises further, more and more of the engagement surface 50 will strike the engagement surface 56. For the crests to pass one another, the float must be depressed considerably in the heavier liquid L1 and a stage is reached where the force needed to depress the float is greater than that needed to lift the valve operating member 42. When this stage is reached, the valve closure member 40 is lifted off its seat 38 and liquid L1 flows from the chamber 20 through the outlet 34. The float will then sink until the surfaces 50, 56 sufficiently disengage from one another to permit the valve operating member 42 to drop and the member 40 to re-engage the seat 38.

Should the valve 36 fail to close properly, perhaps because of a piece of grit between the seat 38 and the member 40, liquid L1 will continue to flow out and the float will sink until the surfaces 52 and 54 engage. In these circumstances the rotating float imparts a series of downwardly directed blows against the surface 54 which tends to press the closure member 40 against the seat 38.

The device can further include two electrical contacts (not shown), one being on the float and the other on the casing 10. Engagement between them can be used to illuminate a lamp, sound a buzzer etc thereby indicating to a supervisor that the float is rising and falling and that the device is thus operating.

Figure 2:
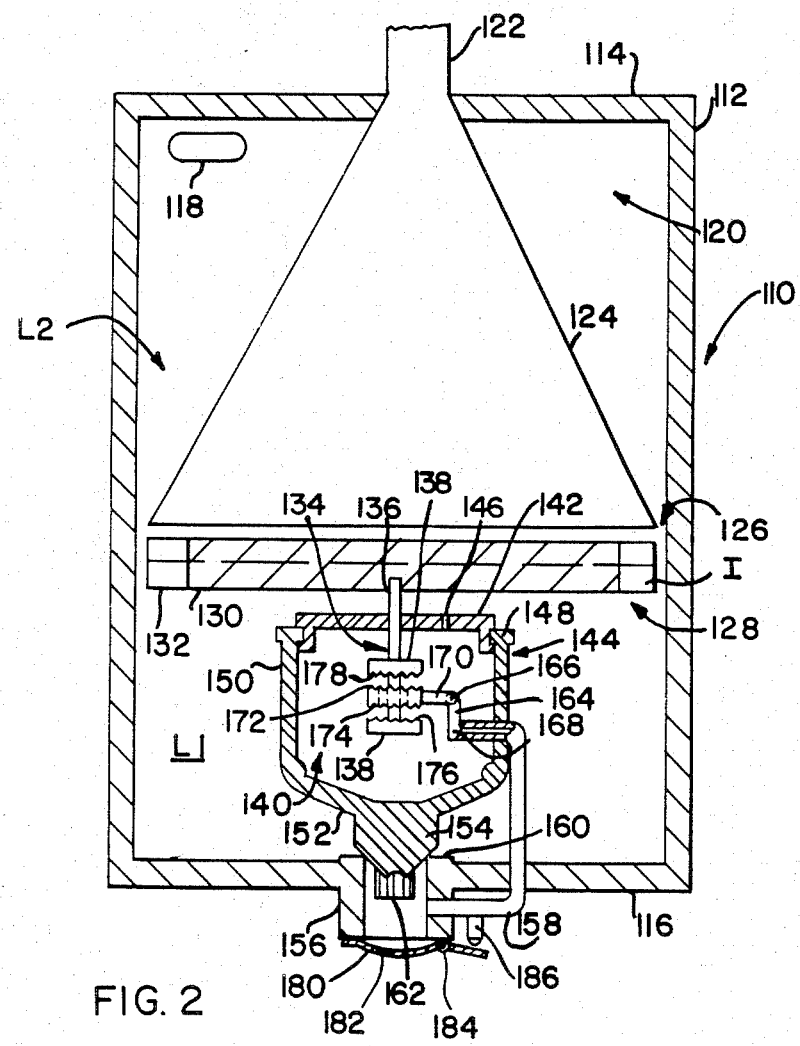
FIG. 2 is a vertical section through a further device for separating two liquids.

The device illustrated in FIG. 2 of the drawings comprises a casing 110 having a generally cylindrical side wall 112, an upper wall 114 and a base wall 116. The inlet 118 to the chamber 120 bounded by the walls 112, 114 and 116 is arranged tangentially so that incoming liquid swirls in the chamber 120.

The main outlet from the chamber 120 is designated 122 and it will be seen that this is in the upper wall 114 and co-axial with the side wall 112. An upwardly tapering frusto conical baffle 124 is co-axial with the side wall 112. Between the lower edge of the baffle 124 and the side wall 112 there is an annular gap 126. It will be understood that liquid entering through the inlet 118 swirls around the baffle 124 and enters the lower portion of the chamber 120 through the gap 126. The centrifuging action thus exerted tends to cause the water to accumulate in the region of the wall 112 and to flow into the lower portion of the chamber 120. Diesel fuel almost devoid of water flows through the outlet 122.

In the lower portion of the chamber 120 there is a float 128 comprising a float body 130 from which fins 132 protrude radially. The fins 132 promote rotation of the float in the swirling liquid. A valve operating member 134 comprising a stem 136 and two disc-like portions 138 is attached to the float body 128.

In the lower part of the chamber 120 there is a control chamber designated 140 which comprises a fixed wall part 142 and a flexible cup 144. A restricted inlet 146 passes through the wall part 142 and places the control chamber 140 in communication with the chamber 120. A flange 148 of the cup 144 secures it to the wall part 142, the cup also having a cylindrical wall 150, a conical wall 152 and a sealing portion 154 at the centre of the wall 152.

An outlet 156 leads downwardly from the chamber 120 through the wall 116, and an outlet pipe 158 extends from the chamber 140 into the outlet 156. The outlet is encircled by a valve seat 160 with which the sealing portion 154 co-operates.

A longitudinally ribbed guide stem 162 extends downwardly from the portion 154 and into the outlet 156.

Within the control chamber 140 there is a lever 164 pivoted at 166 on a bracket or the like (not shown) fast with the fixed wall part 142. At the lower end of the lever 164 there is a valve closure member 168 which enters the inlet end of the pipe 158 to close-off the pipe 158.

Secured to the lever 164 is a link member 170. The stem 136 of the valve operating member 134 passes through an opening in the fixed wall part 142 and through an opening in the member 170. Suitable sealing and bearing means are provided around the stem 136 to permit it to rotate and slide in its opening in the fixed wall part 142. There is clearance between the lower part of the stem 136 and the member 170.

Engagement surfaces shown at 172, 174, 176 and 178 are provided on the upper and lower faces of the member 170 and on the upper and lower faces respectively of the lower and upper disc-like portions 138. The engagement surfaces 172, 174, 176 and 178 can each be saw-like thereby to provide a series of ramps. Alternatively, one engagement surface of each pair of co-operating engagement surfaces can be ramp-like. In yet another form all the engagement surfaces, or one of each co-operating pair of engagement surfaces, can be sinusoidal in form.

The valve operating linkage constituted by the lever 164, link member 170 and stem 136 is normally in the position illustrated in which the valve closure member 168 is seated in the pipe 158. An interface I between the heavier liquid L1 and the lighter liquid L2 is assumed at this stage. The float rotates freely as there is no engagement between the co-operating pairs of engagement surfaces 172, 178 and 174, 176. As heavier liquid L1 accumulates, the interface I moves upwardly as does the rotating float. Eventually, the surfaces 174, 176 begin to engage. As the link member 170 is held against rotation, engagement of the crests of the surface 176 with the crests of the surface 174 causes a chattering or hammering action to be exerted by the float on the member 170. When engagement first occurs, the link member 170 will not necessarily be displaced upwardly. Its mass will normally be sufficient to resist the light blows being struck by the rotating float and consequently the float will itself be slightly depressed so that the crests which have engaged will pass one another thus permitting the float to continue rotating. However, as more liquid L1 accumulates, and the float rises further, more and more of the engagement surface 176 will strike the engagement surface 174. For the crests to pass one another, the float must be depressed considerably in the heavier liquid L1 and a stage is reached where the force needed to depress the float is greater than that needed to lift the link member 170.

It will be understood that as the chamber 140 is in communication with the chamber 120 via the inlet 146, the pressures in the two chambers are normally equal. When the lever 164 pivots to move the member 168 away from the pipe 158 there is immediately a drop in pressure in the chamber 140 as liquid can now flow out. The pressure derived force on the outside face of the cup 144 thus exceeds that on the inside face with the result that the wall 152 is displaced upwardly lifting the sealing portion 154 away from the seat 160. Liquid L1 can thus flow from the chamber 120 through the outlet 156. The float then sinks until the surfaces 174, 176 sufficiently disengage from one another to permit the link member 170 to drop and the member 168 to re-engage in the pipe 158. Closing of the pipe 158 results in the chamber 140 re-filling through the restricted inlet 146. Eventually the cup 144 returns to it undeflected condition so that the sealing portion 154 re-engages the seat 160 to close the outlet 156.

Should the member 168 fail to seat properly, perhaps because of a piece of grit between the member 168 and the pipe 158, the outlet 156 will not be closed. This is because re-filling of the chamber 140 will not be possible and the cup 144 will not return to its undeflected condition. Liquid L1 will continue to flow out and the float will sink until the surfaces 172 and 178 engage. In these circumstances the rotating float imparts a series of downwardly directed blows against the surface 172 which tends to press the closure member 168 into the pipe 158.

Figure 3:
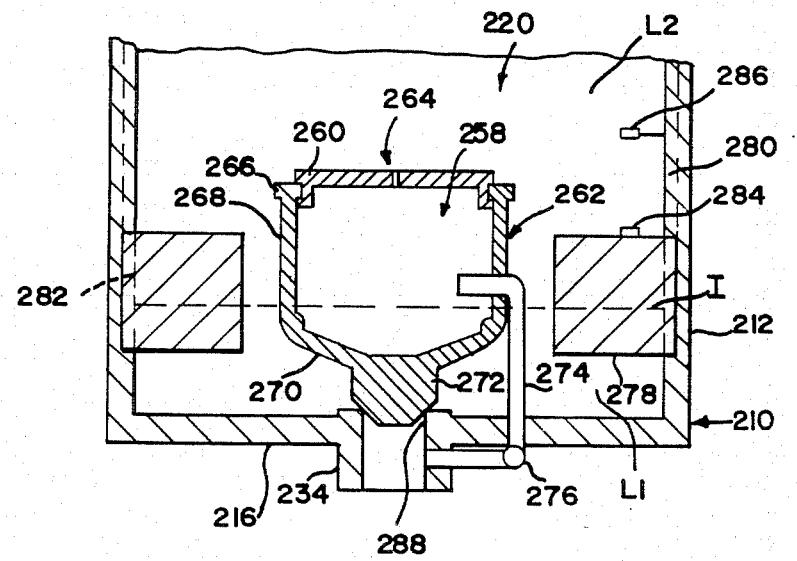
FIG. 3 is a vertical section through a still further device for separating two liquids.

The upper part of the separator shown in FIG. 3 is of the same construction as that of FIG. 1 and includes a casing 210. In the lower part of the chamber 220 there is a control chamber designated 258 which comprises a fixed wall part 260 and a flexible cup 262. A restricted inlet 264 passes through the wall part 260 and places the control chamber 258 in communication with the chamber 220. A flange 266 of the cup 262 secures it to the wall part 260, the cup also having a cylindrical wall 268, a conical wall 270 and a sealing portion 272 at the centre of the wall 270.

An outlet pipe 274 extends from the chamber 258 and enters the main outlet 234 from the chamber 220. A solenoid operated valve 276, which is normally closed, is provided in the pipe 274.

A float 278 encircles the cup 262. The float 278 is prevented from rotating by engagement between ribs 280 on the inner face of the side wall 212 and grooves 282 in the outer periphery of the float. An electrical contact 284 is provided on the upper face of the float 278 and a further contact 286 is provided on the casing 210. These contacts are connected to a source of electrical power (not shown) and to the solenoid of the valve 276.

The sealing portion 272 of the cup 262 normally engages a seat 288 which encircles the outlet 234.

As the heavier liquid L1 accumulates in the chamber 220, the float 278 rises with it until eventually the contact 284 engages the contact 286. This completes the circuit through the solenoid of the valve 276 which then opens. The effect of this is the same as the effect of movement of the valve closure member 168.

Upon heavier liquid L1 flowing out of the chamber 220 through the outlet 234, the float 278 drops separating the contacts 284 and 286. The valve 276 closes at this stage and the subsequent sequence is as described above with respect to FIG. 3.

If desired the contacts 284 and 286 can also be connected to a warning light or buzzer which indicates that the contacts are moving into and out of engagement and that the device is functioning correctly.

An alternative signalling device is shown in FIG. 2. This comprises a dished flap diagrammatically shown at 180 provided below the outlet 156. The flap, which has a hole 182 at the bottom of its dished portion, is pivotally mounted at 184 and is loaded upwardly by a spring (not shown). A micro-switch 186 is provided which is actuated when the flap is desplaced. When the heavier liquid commences to flow out, the flap 180 fills with liquid and the mass of this pivots the flap downwardly. Operation of the micro-switch is used to signal the driver that the device is operating. Once liquid has run out through the hole 182, the flap returns to its initial condition.

A flap as shown at 180 in FIG. 2 can be provided in conjunction with the devices of FIGS. 1 and 3, if desired.

I claim:

1. A device for separating two liquids, the device comprising a float chamber having an inlet with the inlet arranged so that liquid flowing into the chamber through the inlet swirls in the chamber, a float in the float chamber, the float being free to rotate and being such that it sinks in the lighter of the liquids to be separated but floats in the heavier of the liquids, an outlet from the device, a normally closed valve for controlling flow through said outlet, a valve operating member for opening and closing the valve, and first and second engagement surfaces, the first engagement surface being on the float, and rotating therewith and the second engagement surface being on the valve operating member, and at least one of said surfaces being in the form of a ramp which is engaged and repeatedly struck by the other of said surfaces as the float rotates after rising due to an accumulation of the heavier liquid at the bottom of said chamber whereby said valve operating member is displaced to open said valve.

2. A device according to claim 1 in which said outlet is an outlet from a control chamber having a fixed wall part and a movable wall part, the movable wall part being continuously subjected to the pressure existing in the float chamber which pressure urges the movable wall part in the direction which reduces the volume of the control chamber, there being a restricted inlet to said control chamber from the float chamber, and a main outlet from the device, said main outlet being encircled by a valve seat and there being a valve closure member co-operating with said seat and moving with said movable wall part.

3. A device according to claim 2, in which a stem passes through the upper wall of the control chamber, the part of the stem outside the control chamber being attached to the float and the first engagement surface being on said stem within the control chamber and being below the second engagement surface.

4. A device according to claim 3, in which each of the first and second surfaces is constituted by a series of surfaces whereby the valve operating member is subjected to a chattering action as the float rotates while the first and second surfaces are in engagement with one another.

5. A device according to claim 3 or 4, in which third and fourth engagement surfaces are provided, said second and third surfaces being on downwardly and upwardly directed faces respectively of said valve operating member, said stem passing through said member with said first surface on said stem below said second surface and the fourth surface on the stem above the third surface.

6. A device according to claim 1, in which said valve operating member comprises a stem which passes upwardly through the float and has on the upper end thereof a portion which extends radially outwardly from the stem to overlie the float, said second surface being on the underside of said portion and said first surface being on the top face of the float.

7. A device according to claim 1 or 6, in which first and second ramp surfaces are each constituted by a series of surfaces whereby the valve operating member is subjected to a chattering action as the float rotates while the first and second surfaces are in engagement with one another.

8. A device according to claim 1 or 6, in which third and fourth engagement surfaces are provided, at least one of the third and fourth surfaces being in the form of a ramp, the third surface being on the float and the fourth surface being on said stem below the float and engagement between the third and fourth surfaces occuring as the float sinks while the heavier liquid in the lower end of the float chamber is flowing through the open valve whereby said valve operating member is hammered downwardly towards its closed position.

9. A device for separating two mixed liquids which device comprises a main chamber having an inlet for the mixed liquids, a float in the main chamber, the float being such that it sinks in the lighter of the two liquids to be separated but floats in the heavier of the liquids, an outlet from the main chamber, a control chamber having a fixed wall part and a movable wall part, the movable wall part in use being subjected continuously to the pressure existing in said main chamber which pressure urges the movable wall part in the direction which reduces the volume of the control chamber, a permanently open restricted inlet to said control chamber from the main chamber, an outlet from said control chamber, a valve normally closing said outlet from the control chamber, means forming a connection between said valve and the float so that the valve opens when the float lifts and closes when the float falls, a valve seat encircling said outlet from the main chamber, and a valve closure member co-operating with said seat and moving with said movable wall part to open the outlet from the main chamber upon opening of said valve.

10. A device according to claim 9, in which said valve includes an element displacable between a position in which it closes said outlet from the control chamber and a position in which this outlet is open, said means forming a connection between said valve and the float being constituted by a mechanical linkage between the float and said element.

11. A device according to claim 10 and including first and second engagement surfaces, the first engagement surface being on the float and the second engagement surface forming part of said mechanical linkage, and at least one of said surfaces being in the form of a ramp which is engaged by the other of said surfaces as the float rotates after rising due to an accumulation of the heavier liquid at the bottom of said chamber whereby said mechanical linkage is displaced to open said valve.

12. A device according to claim 11, in which a stem passes through the fixed wall part of the control chamber, the part of the stem outside the control chamber being attached to the float and the first engagement surface being on said stem within the control chamber, said linkage being within the control chamber and the first engagement surface being below the second surface.

13. A device according to claim 12, in which said first and second surfaces are each constituted by a series of surfaces whereby said element is subjected to a chattering action as the float rotates while the first and second surfaces are in engagement with one another.

14. A device according to claim 12 or 13 in which third and fourth engagement surfaces are provided, said second and third surfaces being on downwardly and upwardly directed faces respectively of said linkage, said stem passing through said linkage with said fourth surface being on the stem above the third surface.

15. A device according to claim 10 and including first and second engagement surfaces, the first engagement surface being on the float and the second engagement surface forming part of said mechanical linkage, and at least one of said surfaces being in the form of a ramp which is engaged by the other of said surfaces as the float rotates after sinking upon discharge of an accumulation of the heavier liquid at the bottom of said chamber whereby said mechanical linkage is displaced to close said valve.

16. A device according to claim 9, in which said valve is a solenoid valve and said means forming a connection between said valve and the float includes switch means which are actuated when the float lifts.

17. A device for separating two liquids, the device comprising a float chamber having an inlet with the inlet arranged so that liquid flowing into the chamber through the inlet swirls in the chamber, a float in the float chamber, the float being free to rotate and being such that it sinks in the lighter of the liquids to be separated but floats in the heavier of the liquids, an outlet from the device, a normally closed valve for controlling flow through said outlet, a valve operating member for opening and closing the valve, and first and second engagement surfaces the first engagement surface being on the float, and rotating therewith, and the second engagement surface being on the valve operating member, and at least one of said surfaces being in the form of a ramp which is engaged by the other of said surfaces as the float and repeatedly struck sinks upon discharge of an accumulation of the heavier liquid at the bottom of said chamber whereby said valve operating member is displaced to close said valve.

18. A device according to claim 17, in which said outlet is an outlet from a control chamber having a fixed wall part and a movable wall part, the movable wall part being continuously subjected to the pressure existing in the float chamber which pressure urges the movable wall part in the direction which reduces the volume of the control chamber, there being a permanently open restricted inlet to said control chamber from the float chamber, and a main outlet from the device, said main outlet being encircled by a valve seat and there being a valve closure member co-operating with said seat and moving with said movable wall part.

* * * * *